July 4, 1950  T. M. WILLIAMS  2,513,610
REFRIGERATED JUICE DISPENSER

Filed June 2, 1947  2 Sheets-Sheet 2

INVENTOR.
Trevor M. Williams
BY
ATTORNEY

Patented July 4, 1950

2,513,610

UNITED STATES PATENT OFFICE 2,513,610

REFRIGERATED JUICE DISPENSER

Trevor M. Williams, Los Angeles, Calif., assignor to R. D. D. Company, Los Angeles, Calif., a corporation of California Application June 2, 1947, Serial No. 751,755

14 Claims. (Cl. 62—141)

Generally speaking, this invention relates to a refrigerated liquid dispensing apparatus and, more particularly, to an apparatus adapted to contain a quantity of liquid, for example, fruit juice or the like, and to maintain said liquid at a low temperature, for example, 35° F. or the like, by suitable refrigeration apparatus, and to dispense said refrigerated liquid on demand.

There have been numerous prior art liquid dispensing devices arranged to dispense soft drinks, fruit juices and various other liquids. Some of said prior art devices have provided for maintaining the liquids at a low temperature. In many cases this has been achieved through the use of ice or the like. In some instances, mechanical refrigeration units have been utilized. The reason behind the numerous prior art efforts to provide a satisfactory construction is that there is a considerable commercial demand for such a device. For example, numerous fruit juice dispensing bars have come into existence in recent years, wherein various types of fruit and/or vegetable juices, and in some cases other liquids, are sold and dispensed, generally by the glass. At the present time, many such juice bars find it desirable to store the juice, prior to dispensing same, in a plurality of capped or sealed bottles which they keep in a cupboard kept cool by mechanical refrigeration, ice or any other suitable means, the bottles being removed from said cupboard and opened for dispensing the juice upon order. After such dispensing operation, the bottle is then capped and replaced in the refrigerated cupboard or other sealed enclosure. The reason for this general practice in the trade is that no satisfactory refrigerated juice dispensing device has appeared on the scene.

The apparatus of the present invention, generally speaking, comprises a liquid container and a refrigeration unit provided with heat absorbing refrigeration coils adapted to be positioned in an enclosure in a hollow heat-extracting unit and surrounded by a heat-transfer liquid of a relatively low freezing point, the heat-extracting unit being adapted to extend into the liquid container whereby to extract heat from the liquid contained therein and maintain same at the desired temperature. A stirring element may also be positioned in the liquid in the container for slowly, non-turbulently stirring same, if desired.

The apparatus of the present invention has numerous advantages over prior art constructions and succeeds in the desired result where prior art constructions have failed. The provision of a heat-transfer liquid around the refrigeration coils in the enclosure in the hollow heat-extracting unit makes for great heat-transfer efficiency in operation, and furthermore, renders the temperature gradient more nearly uniform. This is a very important item, since it can readily be understood if a heat-absorbing refrigeration coil is placed directly in a liquid to be cooled, the interface between the coil metal and liquid to be cooled where the metal of the coil comes into contact with said liquid to be cooled, will have a high temperature gradient, and the liquid immediately adjacent the coil will be very apt to freeze on the coil and form a coating of ice or frozen particles of the liquid thereon. This has several undesirable effects. First, the formation of a coating of ice on the coils, acts as a heat-insulator and renders the operation of the refrigeration unit ineffective, causing a much greater expenditure of electrical energy in order to maintain a given temperature in the liquid to be cooled or, in effect, making it impossible to maintain the desired low temperature in the liquid to be cooled.

Furthermore, such freezing of the liquid to be cooled which, it is to be remembered, is to be consumed, in many ways has a deleterious effect on the liquid. When a portion of the beverage is frozen, the concentration of soluble solids in the remaining liquid differs from its original content. Freezing also brings about certain irreversible changes which may destroy the taste so as to render the liquid unpalatable or may have a harmful effect upon certain valuable food factors contained therein. For example, it is known that certain of the vital food factors, such as vitamins, minerals, amino acids, enzymes, hormones and others may be affected deleteriously by extremes of temperature, either extreme heat or cold. Therefore, it is very desirable to avoid such freezing.

If liquid in a container of a given volumetric size is to be maintained at a certain low temperature, it is desirable that a relatively large heat-transfer area be utilized so as to effectively cool the liquid in the container. If a very small area of refrigerated surface is placed in contact with the liquid in the container, in order to obtain through such small area a sufficient transfer of heat to cool the large body of the liquid to the desired temperature and maintain it at said desired temperature, the actual temperature of said refrigerated surface would need to be very low indeed. In fact, it would be considerably below the freezing temperature, and the liquid in the container immediately adjacent said cooled surface would freeze thereon with the hereinabove described undesirable effects.

Therefore, prior art constructions, which have attempted to avoid the difficulty encountered by placing the coils in the liquid to be cooled, by having a cooled plate in contact with the liquid to be cooled and itself cooled by the refrigeration coils, have generally been unsuccessful, since the liquid would freeze thereon.

The heat-extracting unit utilized in the present invention is adapted to extend into the container and assume a form whereby a relatively large cooled surface area is in contact with the liquid in the container, and at the same time, a relatively small volume is occupied by the heat-extracting unit. Thus, the heat-extracting unit does not reduce the volumetric capacity of the container to a great extent and yet a very large heat-transfer surface area is provided and the temperature gradient therethrough has been rendered virtually uniform by means of the heat-transfer liquid contained in the heat-extracting unit and around the refrigeration coils. Thus, great efficiency of operation is achieved in an apparatus of minimum size, and the possibility of the liquid in the container freezing on the heat-extracting unit is prevented, whereby the liquid will be most effectively preserved for a relatively lengthy period of time.

The use of the stirring element for slowly, non-turbulently stirring the liquid in the container results in maintaining the liquid in a virtually homogeneous condition, while minimizing the probability of oxidation occurring in the liquid. For example, if orange juice or the like were the liquid in the container, the solids usually contained in the orange juice would settle to the bottom if the stirring element were not used. The continuous, non-turbulent stirring does not mix any air in with the liquid in the container but, rather, has a tendency to remove any air or bubbles that may already be present in the liquid, thus minimizing the probability of oxidation therein.

The combination of these two operations, that is, maintaining the liquid at a relatively low temperature, for example, in the neighborhood of 35° F. and simultaneously, slowly, non-turbulently stirring the liquid causes a liquid such as orange juice, for example, to remain for a very long period of time in a condition virtually impossible to distinguish from freshly extracted juice. Thus, the operator of a juice bar or the like can store juice in the apparatus of the present invention for a much longer period of time than through the use of his present methods, and a substantial commercial advantage will accrue to him through such use.

With the above points in mind, it is an object of this invention to provide an improved refrigerated liquid dispenser having a hollow heat-extracting unit adapted to extend into the liquid to be refrigerated, said hollow heat-extracting unit containing heat-absorbing coils immersed in a heat-transfer liquid of low freezing point, whereby a relatively large heat-transfer surface is provided with a relatively small volumetric displacement and the temperature gradient through said heat-transfer unit is rendered more nearly uniform.

A further object of this invention is to provide an improved refrigerated liquid dispenser having a hollow heat-extracting unit adapted to extend into the liquid to be refrigerated, said hollow heat-extracting unit containing refrigerator heat-absorbing coils immersed in a heat-transfer liquid of low freezing point, whereby a relatively large heat-transfer surface is provided with a relatively small volumetric displacement and the temperature gradient through said heat-transfer unit is rendered more nearly uniform, thus preventing the liquid in contact with the heat-extracting unit from freezing thereon.

It is a further object of this invention to provide an improved refrigerated liquid dispenser having a hollow conical heat-extracting unit extending centrally upwardly into the liquid to be cooled, the hollow conical heat-extracting unit containing heat-absorbing refrigerator coils immersed in a heat-transfer liquid of low freezing point, whereby a relatively large heat-transfer surface is provided with a relatively small volumetric displacement and the temperature gradient through said heat-transfer unit is rendered more nearly uniform.

It is a further object of this invention to provide an improved refrigerated juice dispenser having a hollow heat-extracting unit adapted to extend into the liquid to be refrigerated, said hollow heat-extracting unit containing refrigerated heat-absorbing coils immersed in a heat-transfer liquid of low freezing point, whereby a relatively large heat-transfer surface is provided with a relatively small volumetric displacement and the temperature gradient through said heat-transfer unit is rendered more nearly uniform, and a stirring element adapted to non-turbulently stir the liquid to be cooled for maintaining said liquid in a homogeneous condition.

Another object is to disclose and provide a compact, efficient combination and arrangement of elements in a beverage dispenser, whereby accurate temperature control is assured with widely varying air temperatures.

Other and allied objects will become apparent to those skilled in the art upon a careful examination and study of the illustrations, specification and appended claims. To facilitate understanding, reference will be had to the following drawings:

Figure 1:
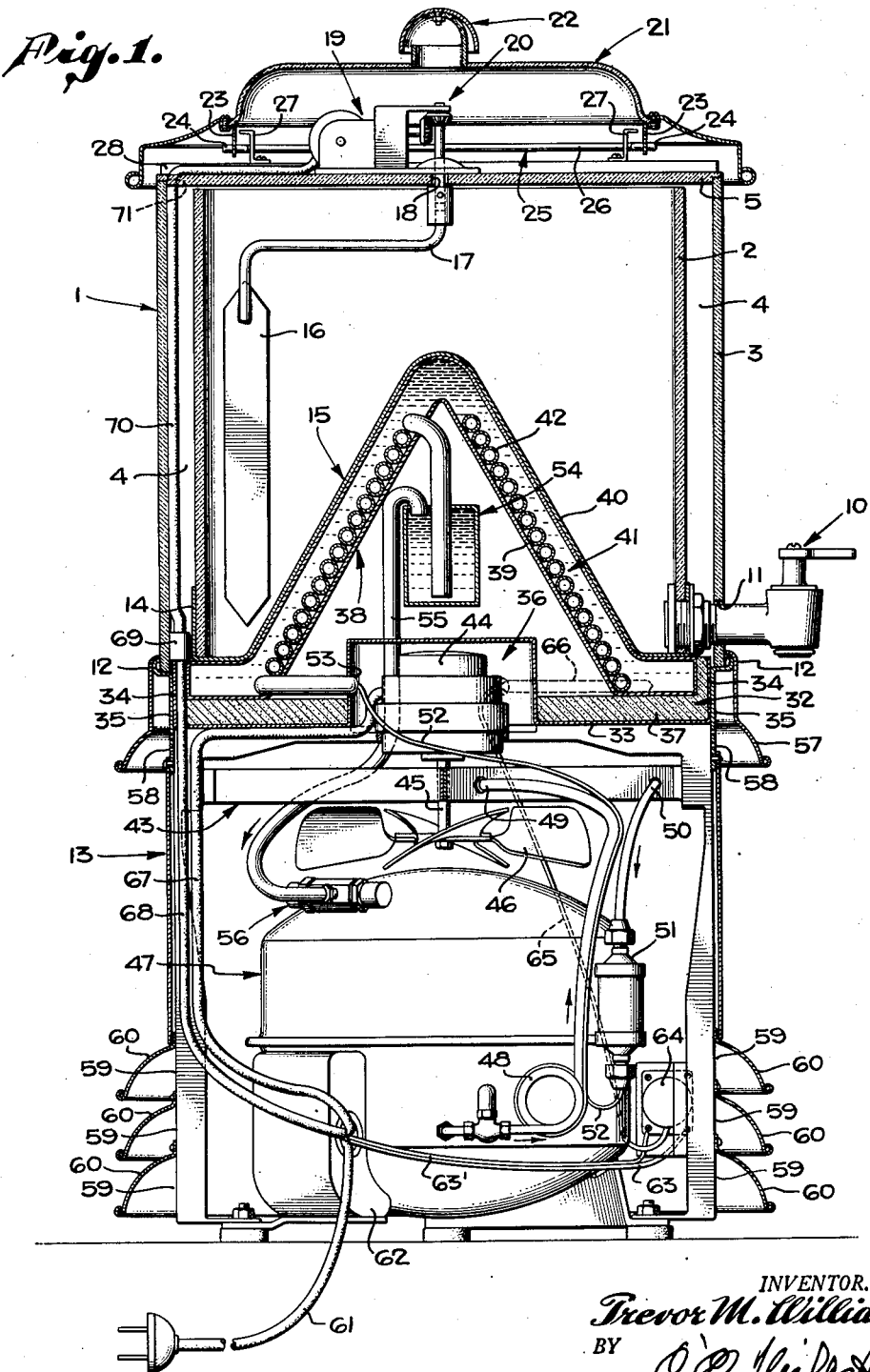
Fig. 1 is an elevation in section of one illustrative form of my invention.
Figure 2:
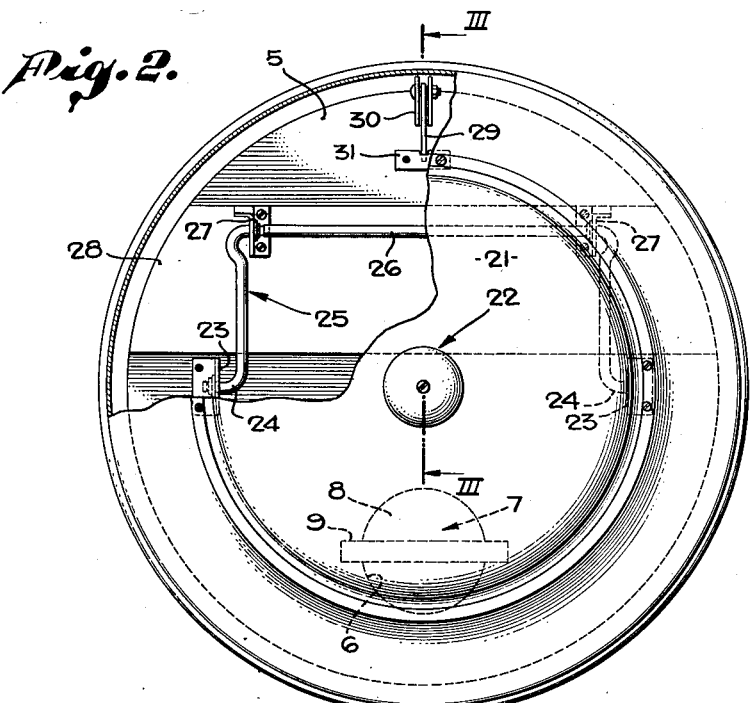
Fig. 2 is a plan view of the apparatus shown in Fig. 1.

More specifically, referring to Fig. 1, a liquid container is provided which in the examples shown comprises a vertical, cylindrical container, indicated generally at 1, which is carried by a base housing indicated generally at 13, and having an inner cylindrical wall which may be of a material resistant to the action of fruit acids, such as glass, in the event fruit juices are to be stored in the container. This inner cylindrical wall is indicated at 2. An outer cylindrical wall 3 is placed around the inner cylindrical wall 2 and is of a sufficiently larger diameter than said inner cylindrical wall 2 as to be spaced therefrom by an air space indicated at 4, which acts as a heat insulator. The outer cylindrical wall 3 may be of any desired material, and in the event it is considered desirable to be able to see the liquid in the container for display purposes or for ascertaining the liquid level, the outer cylindrical wall 3 may be of a suitable transparent or translucent material, such as plastic, glass or any suitable material. The inner cylindrical wall 2 in the example shown being made of glass is also transparent so as to make it possible to see within the container 1. A top or closure 5 is provided for the container 1, which in the example shown is fixedly attached to the top outer cylindrical wall 3 and effectively closes the upper end of the container 1. A port 6 may be provided in the top member 5 for admitting liquid into the interior of the container 1. (This is best shown in Fig. 2.) A suitable cap means indicated at 7 may be provided for closing the port 6 when desired. In the example shown, the cap 7 comprises a plug portion 8 of the same shape and size as the port 6 and adapted to fit into said port 6, and a stop bar 9 mounted on the top of the plug 8 for preventing said plug from falling through the port 6 into the interior of the container 1. Various other cap means may be used. Suitable dispensing means which, in the example shown, comprise a manually operable spigot indicated at 10 are fixedly mounted in and pass through the inner cylindrical wall 2 of the liquid container 1. A vertical slot 11 in the outer cylindrical wall 3 of the liquid container 1 fits removably around the dispensing means 10. The lower end of the outer cylindrical wall 3 of the liquid container 1 removably rests on a curved element 12 on the upper portion of the base housing member indicated generally at 13. The lower end of the inner cylindrical wall 2 of the liquid container 1 has affixed thereto by suitable means, in the example shown by cementing thereto, a circular flange 14 which extends inwardly and upwardly to form the bottom of the juice container 1 and takes the form of a conical protuberance, indicated generally at 15, which is preferably of a thin material of relatively high heat conductivity and relatively immune to the effect of fruit acids, such as for example, stainless steel, silver plated copper and many other materials centrally upwardly directed, in the example shown, between the walls of the liquid container 1. The junction of the circular flange 14 and the lower end of the inner wall 2 of the liquid container 1 is preferably leakage-proof and may also be suitably heat-insulated to prevent heat leakage along the flange 14 past the lower end of the inner wall 2 and along the conical proturberance of bottom 15 into the container 1.

A downwardly extending stirring element, which in the example shown is offset, is indicated at 16 and is, through means of a shaft 17 which passes centrally through an aperture 18 in the top or cover 5, connected to a suitable motor means, indicated generally at 19, for driving same and slowly, non-turbulently rotating liquid contained in the container 1. The motor means 19 may be provided with suitable reduction gearing 20 for reducing the speed of rotation of the stirring element 16 to a point where turbulence will not occur in the liquid in the container 1.

A removable secondary concealing cover, indicated generally at 21, may be provided for concealing the motor means 19 and reduction gearing 20. It may, if desired, also act to trap air and form a dead air space between said removable secondary enclosing cover 21 and the top, closure, or cover 5 closing the top of the liquid container 1, thus improving the heat-insulation at the top of the apparatus.

If desired, suitable decorative lighting, such as neon tubing or the like, may be positioned within the enclosing cover 21.

Suitable means for ventilating the motor means 19 may be provided at 22 if desired.

In the example shown, the movable enclosing cover 21 is pivotally connected by means of perforated downwardly extending lips or brackets 23 to opposed ends 24 of a substantially U-shaped rod, indicated generally at 25, the opposed ends 24 of said rod 25 being in one plane and the central portion of the rod 26 being in a second parallel plane spaced from the first-mentioned plane. The said central portion of the rod 26 is pivotally mounted in perforated upstanding brackets 27, fixedly mounted on top of a raised cross-bar 28 on the cover member 5.

Figure 3:
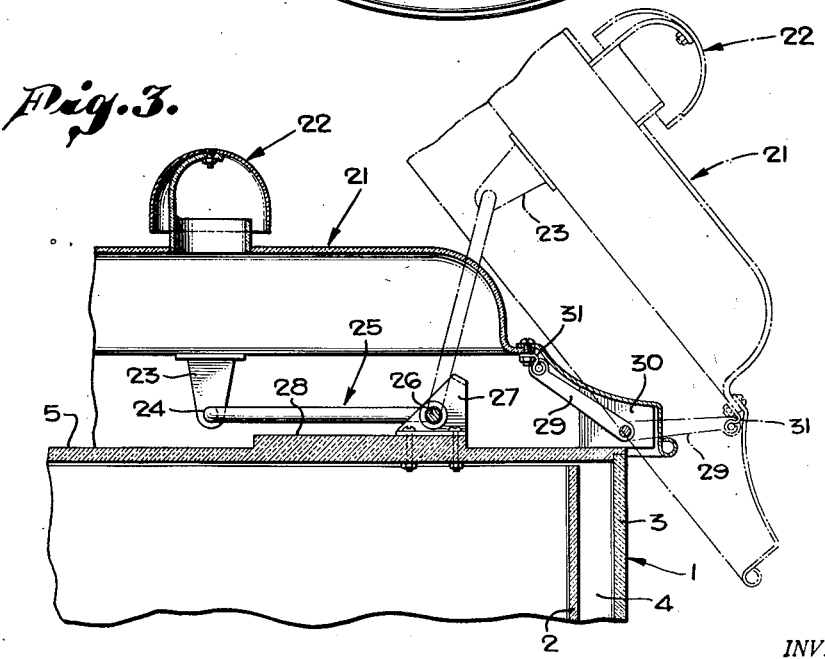
Fig. 3 is a sectional view along the plane III—III of Fig. 2.

A lever arm 29 is pivotally mounted on an upstanding bracket 30 mounted on the top or cover member 5, the other end of the lever member 9 being pivotally connected to a bracket 31 on the enclosing removable cover 21. The operation of the two pivotal connections of the cover member 21 with respect to the top 5 is such as to cause the removable closure member 21 to move from the position shown in Figs. 1 and 2 to the positions shown in Fig. 3 when it is desired to open same.

The housing 13 is provided with a transverse heat-insulating partition indicated generally at 32. In the example shown, a suitable supporting wall or member 33 has upstanding ends 34, which are affixed to the wall 35 of the housing 13 in any suitable manner. The central portion of the supporting member 33 is upwardly recessed to form a motor receiving recess indicated at 36. Suitable heat-insulating material 37 is carried by the supporting member or wall 33.

Resting on the heat-insulating material 37 or positioned between the transverse heat-insulating partition, indicated generally at 32, and the bottom 15 of the container 1 is a heat-extracting unit, indicated generally at 38, which in the example shown is of conical form extending centrally upwardly into the container 1 and in contact with the bottom or conical proturberance 15, forming the bottom of the container 1.

The heat-extracting unit 38, in the example shown, comprises an inner conical wall 39 and an outer conical wall 40, spaced from each other, said inner and outer elements 39 and 40 being joined so as to form a sealed enclosure, indicated generally at 41.

A heat-transfer liquid of low freezing point is contained in the enclosure 41 surrounding heat-absorption, expansion, refrigeration coils 42, which are positioned in the enclosure 41, immersed in the heat-transfer liquid. In the example shown, the coils 42 are symmetrically coiled around the vertical axis of symmetry of the cone formed by the inner wall 39 of the heat-extracting unit 38. However, any other suitable arrangement may be utilized.

A condenser, of any suitable type indicated generally at 43, is mounted within the housing 13 below the transverse heat-insulating partition 32. An electric motor 44 is mounted above the condenser 43 in the recess 36 with the shaft 45 thereof extending vertically through the condenser 43 and having mounted on the end thereof a fan, which in the example shown is a suction fan indicated at 46.

Mounted below the fan 46 is a mechanical refrigeration compressor unit indicated generally at 47. In the example shown, this is a compressor unit of the sealed type wherein an electric motor and the compressor and suitable lubricating means are completely sealed within an outer casing. Other types of compressor units may be utilized, however.

In operation, a suitable refrigerant, is compressed by means of the compressor 47 and flows out of same through conduit 48 in the direction indicated by the arrows and enters the condenser 43 at 49. After traversing the condenser, which is provided with suitable cooling fins and which is cooled by the action of air drawn through the condenser by means of the suction fan 46 driven by the motor 44, the compressed, condensed refrigerant is emitted from the condenser at 50 and flows in the direction of the arrows into a drier 51, which may be any suitable type of drier, and thence through capillary tube 52 and into the lower end of the refrigeration coils 42 indicated at 53. The refrigerant then expands through the coils 42, absorbing heat from the heat-transfer liquid in the enclosure 41 and flows into the accumulator indicated at 54 and thence through conduit 55 into the compressor inlet at 56.

Louver means 57 may be provided around the housing 13, and suitable air inlet ports 58 cooperating therewith for the admission of air into the housing 13 between the condenser 43 and the transverse partition 32, so that air may be drawn through the condenser 43 from the top in a downward direction, as viewed in Fig. 1, by means of a suction fan 46 and then out through outlet air ports indicated at 59 in the lower portion of the housing 13. Suitable louvers 60 may be positioned adjacent the ports 59 if desired.

It will be noted that since the outer cylindrical wall 3 of the container 1 merely rests upon element or lip 12 mounted on the upper end of the base housing 13, and since it has a slot 11 therein positioned around the dispensing means 10, the wall 3 and the cover member 5 attached thereto may be vertically lifted and removed from the apparatus at will, leaving only the inner cylindrical wall 2 remaining in position with respect to the balance of the apparatus. This removal of the outer wall 3 will carry with it the motor means 19, reduction gearing 20, the stirring element 16 and removable concealing cover 21.

The inner wall 2 and the dispensing means 10 affixed thereto may be vertically removed, thus separating the conical protuberance 15 forming the bottom of the inner wall 2 from its contact with the outer conical wall 40 of the heat-extracting unit supported by the transverse partition 32. Thus, the apparatus may readily be disassembled for cleaning and various maintenance purposes. The lower portion of the apparatus contained in the base housing 13 is readily accessible also.

Alternating current input lead 61, which may be connected to the usual commercially available alternating current of 110-120 volts, is fed into a junction box 62. A lead 63 from the junction box 62 is connected to a thermostatically controlled switch 64 of a type well known in the art. A lead 63' from the thermostatically controlled switch 64 is connected to the compressor 47. The thermostatically controlled switch 64 has a tube 65 connected to the temperature sensing element 66 positioned in the heat-transfer liquid in the enclosure 41. This temperature sensing element 66 may be any of the types well known in the art; for example, a gaseous expansion thermometer type adapted to control the opening or closure of the thermostatically controlled switch 64 by means of the variable volume of the gas or vapor contained in the sensing cell 66 and the conduit 65, connecting same to the switch 64. Any type of temperature-sensitive switch may be used.

Thus, effectively, the compressor motor is turned on or off in a cycling manner adapted to maintain the temperature of the heat-transfer liquid in the enclosure 40 at the desired temperature, in a manner well known in the art.

A lead 67 is connected from the junction box 62 to the fan driving motor 44 for operating same. A lead 68 is connected from the junction box 62 to an electrical plug, indicated generally at 69, which comprises a male and female portion, the upper portion of the plug 69 being connected to a lead 70 mounted along the inside wall of the outer cylindrical container 3 and passing through an aperture 71 in the top 5 to the motor 19 for energizing same. The reason for having the electrical plug 69 in the lead is so that the apparatus may be readily disassembled, the male and female plug elements being separated when the outer cylindrical wall 3 of the container 1 is vertically removed.

It is apparent that the upwardly directed conical heat-extracting unit 38 displaces a relatively small volume of liquid in the container 1 and yet has a relatively large surface area available for heat-extraction from the liquid in the container 1. Furthermore, there will be no points of great temperature gradient, the temperature around the whole conical protuberance 15 being relatively constant and at no point low enough to cause freezing of the liquid thereon. Furthermore, the fruit juices contained therein will not readily oxidize or deteriorate and will remain in a condition practically indistinguishable from freshly extracted juice. In such operation, I preferably maintain the juice at a temperature in the neighborhood of 35° F., although I do not intend to limit myself to this temperature.

Numerous modifications and variations of this invention are possible and are intended to be comprehended and included herein. For example, the construction of the liquid container 1 may be varied within wide limits. The walls may not be transparent. It may consist of a single wall rather than a double wall. It may be insulated other than by air. It need not be removable. It may be of a shape other than cylindrical. The stirring element and means for driving the same may be varied within wide limits or may be dispensed with entirely if desired. The cover member or top 5 and the removable and enclosing cover may be modified within wide limits and the latter may be dispensed with entirely if desired. The dispensing means may be modified or dispensed with, if desired. The housing may be modified within wide limits as may be the arrangement of the mechanical refrigeration unit comprising condenser, fan and motor means for driving same, and compressor. The drier 51 may be modified or dispensed with if desired. A different type of refrigeration unit may be utilized. The coils 42 may be disposed differently than in a symmetrically coiled arrangement. The heat-extracting unit may assume a shape other than conical. It may be frusto-conical; it may take a prismoidal shape or various other shapes extending into a liquid container and where the stirring element is not used or is modified and repositioned. The heat-extracting unit may extend into the container other than upwardly and centrally from the bottom.

The examples described and illustrated herein are exemplary only and are not intended to limit the scope of this invention, which is to be interpreted in the light of the appended claims only.

I claim:

1. In a refrigerated juice dispenser including a base housing, a hollow, transparent juice container provided with an inwardly extending, conically formed bottom wall and supported by the housing, a top for the container and a mechanical refrigeration mechanism within the housing, the combination of: a removable heat extracting unit positioned below the bottom of the container and including a conical, hollow walled, sealed element containing a heat transfer liquid of low freezing point and heat absorbing expansion coils for refrigerant, said conical element extending centrally and upwardly into the bottom wall of the container; and means for connecting the ends of the coil with the refrigeration unit.

2. In a refrigerated juice dispenser including a base housing, a hollow, transparent juice container provided with a conical bottom wall and supported by the housing, a top for the container and a mechanical refrigeration mechanism within the housing, the combination of: a removable heat extracting unit positioned at the bottom wall of the container and including a corresponding conical, hollow walled, sealed element containing a heat transfer liquid of low freezing point and heat absorbing expansion coils for refrigerant; said conical element and bottom wall extending centrally and upwardly into the container; a heat insulated horizontal partition beneath said bottom; a horizontally disposed condenser beneath and spaced from said partition; air intake ports in the housing between the partition and condenser; means including a motor and a fan driven thereby for circulating air from the air intake ports through the condenser; and means for connecting the ends of the coil with the refrigeration unit.

3. In a refrigerated juice dispenser including a base housing, a hollow, transparent juice container provided with a conical bottom wall and supported by the housing, a top for the container and a mechanical refrigeration mechanism within the housing, the combination of: a removable heat extracting unit positioned at the bottom wall of the container and including a corresponding conical, hollow walled, sealed element containing a heat transfer liquid of low freezing point and heat absorbing expansion coils for refrigerant; said conical element and bottom wall extending centrally and upwardly into the container; a heat insulated horizontal partition beneath said bottom; a horizontally disposed condenser beneath and spaced from said partition; air intake ports in the housing between the partition and condenser; air outlet ports in the lower portion of the housing; means including a motor and a suction fan driven thereby for circulating air from the air intake ports through the condenser, said motor being mounted above the condenser and partially within a bottom recess of the hollow unit, while the fan driven thereby is beneath the condenser; and means for connecting the ends of the coil with the refrigeration unit.

4. In a refrigerated juice dispenser including a base housing, a hollow, transparent cylindrical body supported by the housing, a top for the body and a mechanical refrigeration mechanism within the housing, the combination of: a seamless bottom for the body, said bottom having a conical protuberance formed thereon and extending into the body; a heat insulated, horizontal partition beneath said bottom; a hollow walled, sealed, heat absorbing unit of conical form positioned between the bottom and said partition and in contact with said bottom.

5. In a refrigerated juice dispenser including a base housing, a hollow, transparent cylindrical body supported by the housing, a top for the body and a mechanical refrigeration mechanism within the housing, the combination of: a seamless bottom for the body, said bottom having a conical protuberance formed thereon and extending into the body; a heat insulated, horizontal partition beneath said bottom; a hollow walled, sealed, heat absorbing unit of conical form positioned between the bottom and said partition and in contact with said bottom; said sealed heat absorbing unit including a body of heat transfer liquid and expansion coils for refrigerant immersed therein; and conduit means for connecting the ends of the coil with the refrigeration unit.

6. In a refrigerated juice dispenser including a base housing, a hollow, transparent cylindrical body supported by the housing, a top for the body and a mechanical refrigeration mechanism within the housing, the combination of: a seamless bottom for the body, said bottom having a conical protuberance formed thereon and extending into the body; a heat insulated, horizontal partition beneath said bottom; a hollow walled, sealed, heat absorbing unit of conical form positioned between the bottom and said partition and in contact with said bottom; a horizontally disposed condenser beneath and spaced from said partition, said condenser being operably connected to the refrigeration unit; air intake ports in the housing between the partition and the condenser; and means including a motor and a fan driven thereby for circulating air from the air intake ports through the condenser.

7. In a refrigerated juice dispenser including a base housing, a hollow, transparent cylindrical body supported by the housing, a top for the body and a mechanical refrigeration mechanism within the housing, the combination of: a seamless bottom for the body, said bottom having a conical protuberance formed thereon and extending into the body; a heat insulated, horizontal partition beneath said bottom; a hollow walled, sealed, heat absorbing unit of conical form positioned between the bottom and said partition and in contact with said bottom; a horizontally disposed condenser beneath and spaced from said partition, said condenser being operably connected to the refrigeration unit; air intake ports in the housing between the partition and the condenser; air outlet ports in the lower portion of the housing; and means including a motor and a suction fan driven thereby for circulating air from the air intake ports through the condenser and out the air outlet ports, said motor being mounted above the condenser while the fan driven thereby is beneath the condenser.

8. In a refrigerated juice dispenser including a vertical, cylindrical, transparent juice container having air spaced and insulated side walls and a conical bottom wall extending upwardly into said container, a closure member therefor and a refrigeration unit mounted therebelow provided with heat absorbing refrigeration coils, the combination of: a conical heat extracting unit extending centrally upwardly into the conical bottom wall from the bottom thereof and including an inner conical wall and an outer conical wall connected so as to form a sealed enclosure therebetween; the heat absorbing refrigeration coils being mounted in said sealed enclosure symmetrically wound around the axis of symmetry of the cone; heat transfer liquid having a low freezing point filling said sealed enclosure around the refrigeration coils; a downwardly extending offset stirring element rotatably mounted in said closure member and adapted to extend into the juice in the container between the walls thereof and the upwardly extending heat extracting unit; and motor means mounted on said closure for rotating said stirring element whereby the juice in the container will be slowly, non-torbulently rotated.

9. In a refrigerated juice dispenser including a vertical, transparent juice container having side walls, closure therefor, and a refrigeration unit mounted adjacent thereto provided with a heat absorbing refrigeration coil, the combination of: a conical heat extracting unit extending upwardly between the side walls of the container and including an inner wall and an outer wall connected so as to form an enclosure; the heat absorbing refrigeration coils being mounted in said enclosure in coiled arrangement around the axis of the cone; a heat transfer liquid having a relatively low freezing point in said enclosure around said refrigeration coils; a stirring element arranged to extend downwardly into the juice in the container between the side walls thereof and the upwardly extending heat extracting unit; and motor means for rotating said stirring element in said juice.

10. In a refrigerated liquid dispenser including a liquid container having side walls, a closure member therefor and a refrigeration unit mounted adjacent thereto provided with heat absorbing refrigeration coils; the combination of: a heat extracting unit extending upwardly between the side walls of the container from the bottom thereof and including an inner wall and an outer wall connected so as to form a sealed enclosure; the heat absorbing refrigeration coils being mounted in said sealed enclosure; and heat transfer liquid having a low freezing point in said sealed enclosure around the refrigeration coils.

11. In a refrigerated liquid dispenser including a juice container, a closure therefor and a refrigeration unit associate therewith provided with heat absorbing refrigeration coils, the combination of: a heat extracting unit positioned between said walls of the container and including an inner wall and an outer wall connected so as to form a enclosure; the heat absorbing refrigeration coils being mounted in said enclosure and connected to said refrigeration unit; and a heat transfer liquid having a relatively low freezing point in said enclosure around said refrigeration coils.

12. In a refrigerated liquid dispenser including a liquid container and a refrigeration unit provided with heat absorbing coils, the combination of: a hollow heat extraction unit projecting between walls of liquid container and providing a hollow enclosure; and a heat transfer liquid having a relatively low freezing point in said enclosure; the said coils being positioned in said enclosure immersed in said heat transfer liquid.

13. In a refrigerated juice dispenser including a base housing, an upper housing, a hollow, transparent juice container within said upper housing, a top for the container, a mechanical refrigeration mechanism within the base housing, a bottom wall for the said container adapted to accommodate a removable heat-extracting unit, said heat-extracting unit consisting of a hollow walled, cone-shaped, sealed element containing a heat-transfer liquid of low freezing point and heat-absorbing, expansion coils for refrigerant, said element extending centrally and upwardly between the confines of the container walls.

14. A refrigerated juice dispenser in accordance with claim 13, wherein there is provided a heat-insulated, horizontal partition beneath said cone-shaped element, a horizontally disposed condenser beneath and spaced from said partition, air intake ports in the housing between the partition and condenser, air outlet ports in the lower portion of the base housing, and means including a motor and a suction fan driven thereby for circulating air from the air intake ports through the condenser, said motor being mounted above the condenser and partially within a bottom recess of the hollow unit.

TREVOR M. WILLIAMS.

REFERENCES CITED

The following references are of record in the file of this patent:

UNITED STATES PATENTS

| Number | Name | Date |
|---|---|---|
| 1,708,625 | Livingston | Apr. 9, 1929 |
| 1,859,566 | Konikow | May 24, 1932 |
| 1,954,518 | Downer | Apr. 10, 1934 |
| 2,076,114 | Bethancourt | Apr. 6, 1937 |
| 2,358,756 | Zoller | Sept. 19, 1944 |